Inventor
William B. Elmer

United States Patent Office

3,526,459
Patented Sept. 1, 1970

3,526,459
OPTICAL ILLUMINATING SYSTEM
William B. Elmer, Boston, Mass., assignor to Dennison Manufacturing Company, Framingham, Mass., a corporation of Nevada
Filed May 20, 1968, Ser. No. 730,397
Int. Cl. G03b 27/54
U.S. Cl. 355—67                                    9 Claims

ABSTRACT OF THE DISCLOSURE

A microfilm copier has an optical system for illuminating a transparency supported on a window and for projecting an image of the transparency on photosensitive paper. The illuminating system, which projects light through the transparency to a projection lens, includes an ellipsoidal reflector holding a quartz-halogen lamp. The reflector has an axial opening for the lamp, is generally specular and covers the solid angle defined by lines from the lens aperture through the opposite edge of the transparency frame. The solid angle subtended by the lens from the center of the transparency is substantially greater than the solid angle subtended by the reflector opening from the transparency center. As a result the tendency of the lamp opening in the reflector to cast a dark shadow area on the center of the transparency is compensated while permitting the use of a small economical lens.

Figure 1:
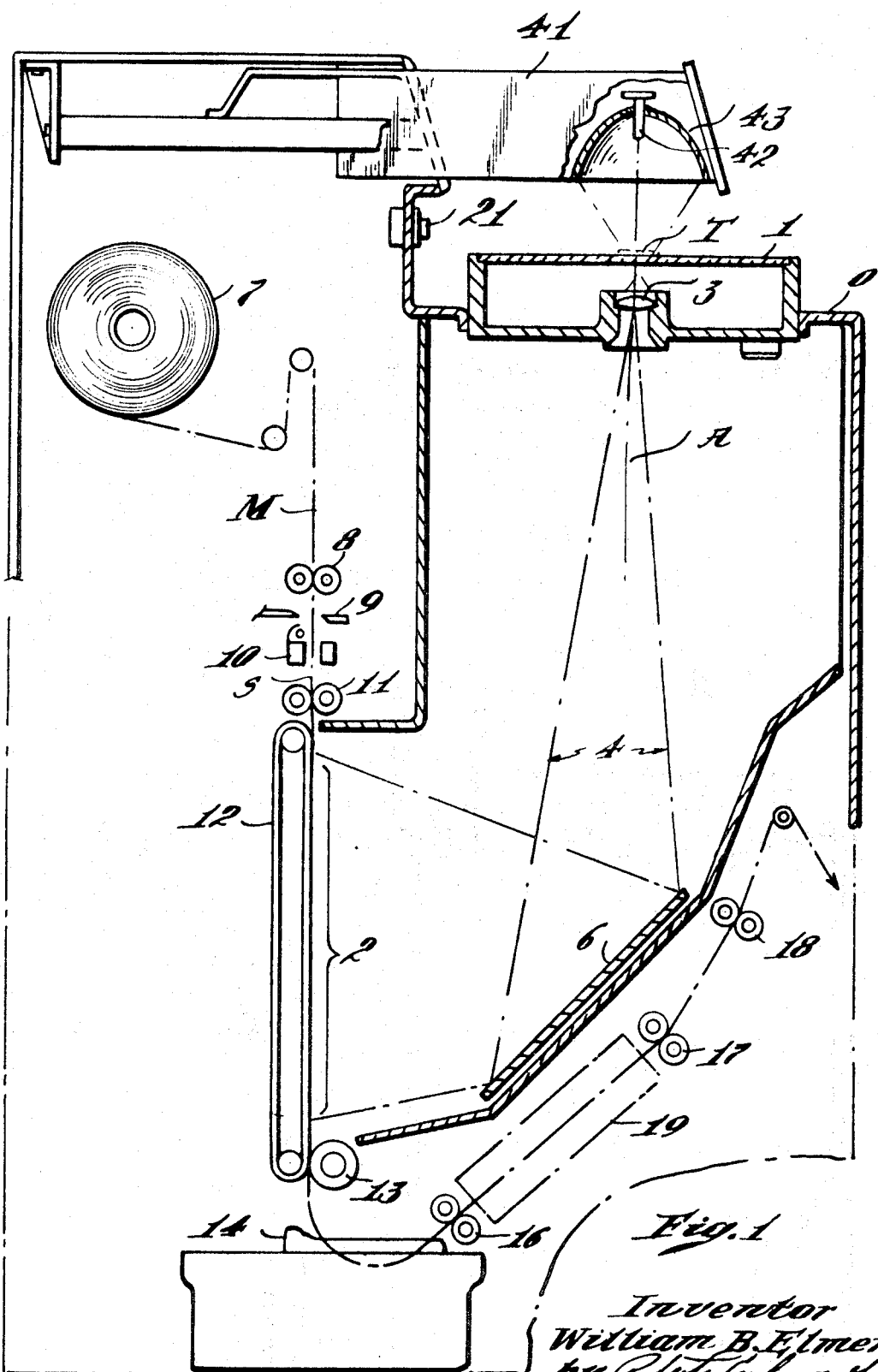

Optical illuminating systems for the projection and printing of transparent records frequently comprise a curved reflector mounting a lamp whose rays are directed by the reflector through the transparency to a lens which projects an image of the transparency on a plane. With a projector a screen or viewing window is in the image plane; with a printer an exposure window framing photosensitive paper is in the image plane. While it is desirable to illuminate the transparency somewhat more at the corners and edges to compensate for lens attrition, it is generally essential that the transparency be illuminated with no pronounced light or dark spots.

However, to mount a lamp in a curved reflector, it is necessary to form an opening of finite size in the reflector surface through which the base of the lamp can extend to a socket or the like. Usually the opening is central of the reflector, and in any case reduces the reflector area which illuminates the center of the transparency so that a distinctly darker area of illumination appears at the center of the transparency surrounded by a ring brighter than the illumination at the edge of the film.

Because of the spatial and monetary economy of small lenses the lens is most advantageously of the same order of size as the lamp opening in the reflector. Small lenses, however, effectively cause a further reduction in the illumination of the central portion of the transparency by narrowing the effective cone of light from the reflector. This reduces the bright area of the reflector while the dark lamp opening remains constant, and produces the distinctly dark area at the center of the transparency. Moreover, in a filament lamp, the individual windings of the filament are projected as light irregularities on the transparency. Irregularities in the reflector surface also produce irregularities in the illuminated area and print.

The object of the present invention is to provide an optical system which properly illuminates a transparency and avoids the irregularities discussed above.

According to the invention such an optical illuminating system comprises an ellipsoidal reflector having an axial opening, a lamp extending through said opening into the reflector, said lamp having a translucent envelope occupying a substantial volume and a filament centered at one focus of the reflector, a lens of predetermined aperture opposite the reflector and on said axis, said lens preferably being of the same order of size as said reflector opening, and support means for holding a transparency in a plane normal to said axis between said reflector and lens, said transparency comprising a frame whose edges have a predetermined spacing and whose center is on said axis, said envelope comprising a diffusing material such that the envelope is made luminous by the filament, said reflector covering the solid angle defined by lines from the lens aperture through the opposite edge of the transparency frame, and the solid angle subtended by the lens from the center of the transparency being substantially greater than the solid angle subtended by the reflector opening from the transparency center, whereby the size of said lens may be minimized and the loss of light from the reflector opening is compensated so as to illuminate the center portion of the transparency less than the edge portions, but without a distinctly dark area in the center portion.

Figure 2:
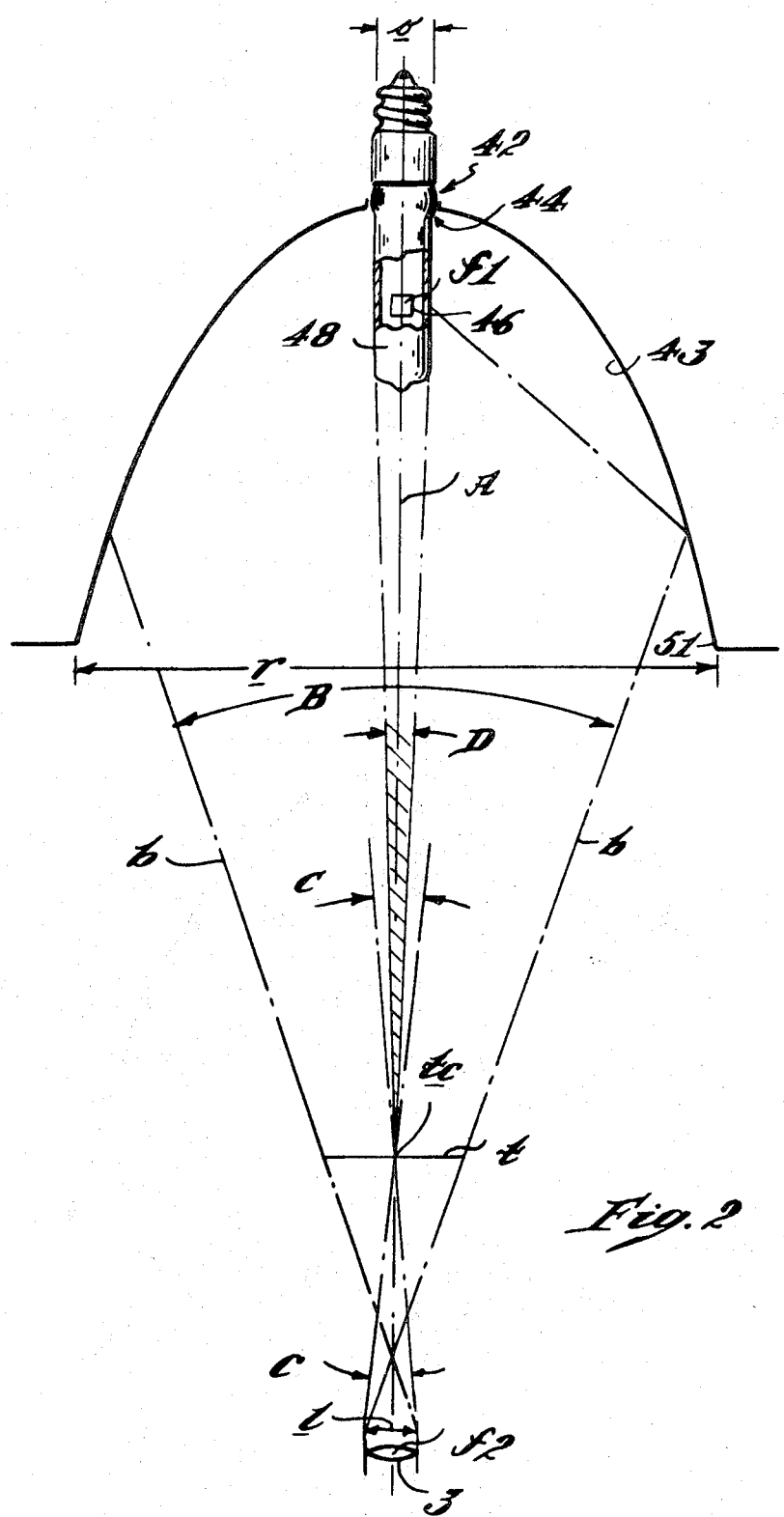

For the purposes of illustration a typical embodiment of the invention is shown in the accompanying drawings, in which:

FIG. 1 is a sectional elevation of apparatus for printing a copy of a transparency; and FIG. 2 is an optical diagram of the transparency illuminating system of the apparatus.

The particular embodiment of the invention chosen for the purpose of illustration comprises an electrostatic copier like that disclosed and claimed in the copending application of Kenneth J. White, Ser. No. 587,197, filed Oct. 17, 1966. As disclosed in that application the copier comprises a housing O having a record window 1 for supporting a transparent record T, and an exposure window 2 in which a strip of light-sensitive material M may be exposed, an image of the record being projected by a lens 3 to the exposure window along an optical path indicated at 4 which includes a mirror 6. The lens 3 is preferably adapted to magnify the records many times so as to produce enlarged prints of microfilm and other small records. The strip is fed from a roll 7 by rollers 8 to a cutter 9 which cuts off sheets S, the sheets being fed to the exposure window by rollers 11 and belt 12 past a corona discharge device 10. After being exposed the sheets are fed from the window 2 by belt 12 and roller 13 to a developer or toner tray 14 and thence by rollers 16, 17 and 18 through a dryer 19 to a delivery station. In each cycle of operation one sheet is printed from the transparency. Each cycle is initiated by momentarily closing a switch 21. The means for effecting a cycle of operations are fully disclosed in the aforesaid copending application and forms no part of the present invention.

In the upper part of the housing is a slide 41 movable to an operative position shown in solid lines in FIG. 1. The slide carries a lamp 42 and a reflector 43 for projecting a beam of light through the transparency T on the record window 1. To position the transparency on the window 1, the slide 41 is moved to a position, not shown, in which the transparency may be viewed as described in the copending application of William P. Tosti for Photocopier, Ser. No. 648,149, filed June 22, 1967. While viewed the transparency may be manually centered on the axis A of the lens 3. Then when the slide 41 is moved to the position shown the transparency is registered with the window 2. Actuating the switch 21 initiates the print cycle during which the transparency is illuminated by the lamp 42 and reflector 43 and an image of the transparency focussed on the detached strip S of photosensitive paper in the window 2.

The illuminating system is shown enlarged in FIG. 2. As shown therein, the reflector is ellipsoidal, that is, a surface of revolution of an ellipse, having foci $f1$ and $f2$ on the axis A of the lens 3. One focal point $f1$ is at the center of a volume 46 occupied by the filament of a quartz-halogen 75 watt, 28 volt lamp 42 type 75 Q/CL. In such a lamp the coils of filament occupy a volume of about a 0.15 inch cube. The other focal point $f2$ is at the lens 3, which, in the example shown has a focal length of 50 mm., an aperture ratio of $f/5.6$ and an aperture $l$ of 0.35 inch. The lamp 42 has a quartz envelope 48, about 3/8 inch in diameter and 1¼ inches in length. The base 49 of the lamp extends through a 19/32 inch diameter circular opening 44 central of the reflector 43 and concentric with the axis A. From the lamp opening 44 the reflector extends 3.1 inches along the axis A to its open end 51 whose diameter is approximately 5½ inches. The foci $f1$ and $f2$ are located respectively 0.675 inch and 8.795 inches from the opening 44. The transparency supported on the record window 1 is typically a microfilm with a frame area of 0.90 inch by 0.52 inch between edges and 1.04 inches on the diagonal $t$ which is located 2.1 inches from the focal point $f2$, although the transparency location may be varied dependent upon the focal length of the lens and the desired size of the image projected on the print window 2. The system described produces an 8½ inch by 11 inch image of the microfilm at the print window 2.

The exemplary dimensions given above meet two conditions. First, the area $r$ of the reflector open end 51 covers the solid angle B defined by lines $b$ from the lens aperture $l$ through the opposite edges of the transparency frame represented by its diagonal $t$. Second, the solid angle C subtended by the lens from the center of the transparency diagonal $t$ is substantially larger than the solid angle D subtended by the reflector opening 42 from the transparency center $tc$. In consequence of the first condition the transparency is illuminated from edge to edge by light which can be received through the small lens aperture $l$ of the same order of size (0.35 inch) as the lamp opening $o$ (0.59 inch). This aperture optimizes the relative size of the reflector 43 and lens 3, while assuring adequate illumination of the transparency. In consequence of the second condition combined with the first, a distinct dark area at the center $tc$ of the transparency is avoided. Such a dark area occurs in the shaded solid angle D subtended by the lamp opening 44 from the center $tc$ of the transparency owing to the absence of reflection from the opening.

A cross-sectional area of the solid angle D should not exceed approximately 25 percent of the corresponding cross-sectional area of the solid angle C subtended by the lens aperture $l$ from the center point $tc$ of the transparency.

With the conditions given the darkening effect of the lamp opening is reduced so that there is no distinctly dark area on the transparency, and so that there is roughly less than 25 percent variation in light level from edge to edge of the transparency frame. Moreover, the central area of the transparency is less highly illuminated than the edges to correct for light attrition by the lens and assure that the print window 2 is uniformly illuminated.

If the filament were a point light source rather than the volume 46, or if the reflector were precisely geometric, the system so far described would properly illuminate the transparency. With an imperfection, however, it is further desirable to compensate for reflector surface irregularities whose effect is ascertained by the volume of the filament.

It has been found that if the lamp envelope 48 is a diffuser, any illumination deficiencies not corrected by the previously discussed optical conditions are substantially eliminated. The lamp envelope may comprise a milky or frosted glass or quartz, or it may be sandblasted only, or the sandblasted surface further coated with a white metallic oxide powder such as zinc oxide or other metallic oxide of high specific reflectance. Dry zinc oxide may be rubbed on the sandblasted envelope and adheres without any further agent. Usually the lamp is installed in the reflector during manufacture or replacement and is not thereafter subject to direct handling, particularly if the reflector has a temporary protective cap. In any case the oxide coating adheres well despite shock. Such a diffusing envelope made luminous by the filament acts as a second light source superimposed on the filament and cooperates with the first and second mentioned optical conditions to compensate for the darkening effect of the lamp opening 42 as well as for reflector irregularities and filament volume.

Alternatively to sandblasting or coating the lamp envelope the reflecting surface of the reflector may be slightly diffuse although generally specular. A substantially specular but slightly diffuse surface is present on an aluminum reflector which has been drawn to shape in a die, and which retains in the optical art an "orange peel" surface, i.e., generally smooth or specular and with minor areas of diffusing indentations, after conventional brightening. Such a slightly diffuse reflector also softens and makes uniform the lamp filament image.

While one desirable embodiment of the invention has herein been disclosed by way of example, it is to be understood that the invention is broadly inclusive of any and all modifications falling within the terms of the appended claims.

I claim:
1. An optical illuminating system comprising
   an ellipsoidal, substantially specular, reflector having an axial opening,
   a lamp extending through said opening into the reflector, said lamp having a translucent envelope occupying a substantial volume and a filament centered at one focus of the reflector,
   a lens of predetermined aperture opposite the reflector and on said axis,
   and support means for holding a transparency in a plane normal to said axis betwen said reflector and lens, said transparency comprising a frame whose edges have a predetermined spacing and whose center is on said axis,
   said reflector covering the solid angle defined by lines from the lens aperture through the opposite edge of the transparency frame, and
   the solid angle subtended by the lens from the center of the transparency being substantially greater than the solid angle subtended by the reflector opening from the transparency center,
   whereby the size of said lens may be minimized and the loss of light from the reflector opening is compensated so as to illuminate the center portion of the transparency less than the edge portions, but without a distinctly dark area in the center portion.

2. A system according to claim 1, wherein said lens is of the same order of size as said reflector opening.

3. A system according to claim 1 wherein the cross-sectional area of the solid angle subtended by said lamp opening from a central point of the transparency is less than substantially twenty-five percent of the corresponding cross-sectional area of the solid angle subtended by the lens aperture from the same point.

4. A system according to claim 1 wherein said lamp envelope comprises a diffusing material such that the envelope is made luminous by the filament.

5. A system according to claim 3 wherein said lamp envelope comprises a diffusing material such that the envelope is made luminous by the filament.

6. A system according to claim 5 wherein said envelope has a sandblast surface with a coating of white powder of high specific reflectance.

7. A system according to claim 6 wherein said powder is a white metallic oxide.

8. A system according to claim 7 wherein said powder is zinc oxide.

9. A system according to claim 1 wherein the reflecting surface of said reflector is generally specular with minor diffusing indentations, thereby to diffuse the filament image further to compensate for the darkening effect of the reflector opening.

References Cited

UNITED STATES PATENTS

| 1,633,228 | 6/1927 | Rogers | 355—67 |
| 2,338,901 | 1/1944 | Cniti | 240—41.3 |
| 3,241,437 | 3/1966 | Thiels | 355—67 |

NORTON ANSHER, Primary Examiner

M. D. HARRIS, Assistant Examiner

U.S. Cl. X.R.

240—41.35; 355—52